United States Patent [19]
Williams et al.

[11] Patent Number: 5,680,616
[45] Date of Patent: Oct. 21, 1997

[54] METHOD AND SYSTEM FOR GENERATING AND MAINTAINING PROPERTY SETS WITH UNIQUE FORMAT IDENTIFIERS

[75] Inventors: Antony S. Williams; Edward A. Martinez, both of Redmond; Dean J. Hachamovitch, Seattle, all of Wash.

[73] Assignee: Microsoft Corporation, Redmond, Wash.

[21] Appl. No.: 467,015

[22] Filed: Jun. 6, 1995

Related U.S. Application Data

[63] Continuation of Ser. No. 227,859, Apr. 15, 1994, Pat. No. 5,467,472.

[51] Int. Cl.$^6$ ........................................ G06F 17/30
[52] U.S. Cl. ........................................ 395/614; 395/611
[58] Field of Search ........................................ 395/600, 611, 395/612, 613, 614

[56] References Cited

U.S. PATENT DOCUMENTS

| | | | |
|---|---|---|---|
| 5,161,225 | 11/1992 | Abraham et al. | 395/600 |
| 5,202,981 | 4/1993 | Shackelford | 395/600 |
| 5,265,206 | 11/1993 | Shackelford et al. | 395/200 |
| 5,270,831 | 12/1993 | Parulski et al. | 358/403 |
| 5,295,256 | 3/1994 | Bapat | 395/500 |
| 5,545,101 | 8/1996 | Mackay et al. | 395/600 |
| 5,551,029 | 8/1996 | Jagadish et al. | 395/600 |
| 5,557,785 | 9/1996 | Lacquit et al. | 395/600 |

OTHER PUBLICATIONS

"Aldus TIFF Developer's Toolkit", pp. i–vi, 3–6, Aldus Corporation, Sep. 1990.

"A Guide to the Tag Image File Format Version 5.0", pp. 1–9, 17–18, Hewlett Packard Company, Aug. 1, 1990.

Harris, Jed and Ira Ruben, "Bento Specification, Revision 1.0d4", Apple Computer, Inc., Aug. 17, 1992.

Cohen, Raines, "Apple sets Bento Standard for mixing diverse data types", *MacWEEK,* vol. 6 No. 3, 1992.

*Primary Examiner*—Thomas G. Black
*Assistant Examiner*—Donald D. Min
*Attorney, Agent, or Firm*—Seed and Berry LLP

[57] ABSTRACT

A method and system for generating and maintaining property sets is provided. In a preferred embodiment, a property set stream is generated. The stream comprises three parts: a header, a section locator array, and one or more sections. The header contains information for uniquely identifying the property set and for identifying the number of sections within the property set. The section locator array contains a unique identifier for each section and an offset indicating where the section resides within the stream. The third part, the section definitions, contains the information necessary to maintain groups of properties for each section. Each section contains a section header, a property locator array, and an array of property type/value pairs. The section header indicates both the size of the section and the number of properties defined within the section. The property locator array contains unique property identifiers for each property defined in the section and a relative offset, from the beginning of the section, to the property definition. Each property definition appears as a type/value pair, the type indicator indicating the data format for the property and the value field containing or referencing the data. In a preferred embodiment, a property set is generated by allocating appropriate storage and by storing values in the standard structure for a property set.

15 Claims, 12 Drawing Sheets

METHOD AND SYSTEM FOR GENERATING AND MAINTAINING PROPERTY SETS WITH UNIQUE FORMAT IDENTIFIERS

CROSS-REFERENCE TO RELATED APPLICATION

This application is a continuation of U.S. patent application Ser. No. 08/227,859 filed Apr. 15, 1994, now U.S. Pat. No. 5,467,472.

TECHNICAL FIELD

The present invention relates generally to a computer system for managing sets of properties and, more specifically, to a method and system for generating and maintaining property sets in an application independent manner.

BACKGROUND OF THE INVENTION

Often times software programs desire to share state information with other programs. For example, word processing programs commonly maintain summary information regarding the documents they create and manage. The document summary information might include, for example, information such as the name of the document, its author, some key words regarding the contents of the document, and time-related information such as the date and time the document was created and the date and time the document was last modified. If another program, such as a program that displays information regarding files and directories in the file system, desires to display such state information regarding the documents created by the word processing program, then a prearranged agreement regarding how to transfer this information needs to have been established between the two programs.

In some prior systems, such state information is placed in a well-known location such as within a file with an agreed-upon file name. For example, applications written to execute on the Windows operating system environment often store such information in files ending with the ".INI" extension. In such files, state information is typically limited to the kind of information that can be stored as numbers or strings. As another example, in the OS/2 operating system, limited state information can be stored as file attributes associated with particular files. In OS/2, the state information stored in file attributes relates to that particular file. Thus, state information regarding an entity, at a smaller granularity than a file is not possible using that scheme. Furthermore, if such files are moved to other operating systems that do not support such file attributes, the information is lost.

The present invention is described below using some object-oriented techniques; thus, an overview of well-known object-oriented programming techniques is provided. Two common characteristics of object-oriented programming languages are support for data encapsulation and data type inheritance. Data encapsulation refers to the binding of functions and data. Inheritance refers to the ability to declare a data type in terms of other data types. In the C++ language, data encapsulation and inheritance are supported through the use of classes. A class is a user-defined type. A class declaration describes the data members and function members of the class. A function member is also referred to as a method of a class. The data members and function members of a class are bound together in that the function operates on an instance of the class. An instance of a class is also called an object of the class. Thus, a class provides a definition for a group of objects with similar properties and common behavior.

To allocate storage for an object of a particular type (class), an object is instantiated. Once instantiated, data can be assigned to the data members of the particular object. Also, once instantiated, the function members of the particular object can be invoked to access and manipulate the data members. Thus, in this manner, the function members implement the behavior of the object, and the object provides a structure for encapsulating data and behavior into a single entity.

To support the concept of inheritance, classes may be derived from (based upon the declaration of) other classes. A derived class is a class that inherits the characteristics—data members and function members—of its base classes. A class that inherits the characteristics of another class is a derived class. A class that does not inherit the characteristics of another class is a primary (root) class. A class whose characteristics are inherited by another class is a base class. A derived class may inherit the characteristics of several classes; that is, a derived class may have several base classes. This is referred to as multiple inheritance.

A class may also specify whether its function members are virtual. Declaring that a function member is virtual means that the function can be overridden by a function of the same name and type in a derived class. If a virtual function is declared without providing an implementation, then it is referred to as a pure virtual function. A pure virtual function is a virtual function declared with the pure specifier, "=0". If a class specifies a pure virtual function, then any derived class needs to specify an implementation for that function member before that function member may be invoked. A class which contains at least one pure virtual function member is an abstract class.

FIG. 1 is a block diagram illustrating typical data structures used to represent an object. An object is composed of instance data (data members) and function members, which implement the behavior of the object. The data structures used to represent an object comprise instance data structure 101, virtual function table 102, and the function members 103, 104, 105. The instance data structure 101 contains a pointer to the virtual function table 102 and contains data members. The virtual function table 102 contains an entry for each virtual function member defined for the object. Each entry contains a reference to the code that implements the corresponding function member. The layout of this sample object conforms to the models described in U.S. Pat. No. 5,297,284, entitled "A Method for Implementing Virtual Functions and Virtual Bases in a Compiler for an Object Oriented Programming Language," which is hereby incorporated by reference. One skilled in the art would appreciate that other object models can be defined using other programming languages.

An advantage of using object-oriented techniques is that these techniques can be used to facilitate the sharing of objects. For example, a program implementing the function members of an instantiated object (a "server program") can share the object with another program (a "client program"). To allow an object of an arbitrary class to be shared with a client program, interfaces are defined through which an object can be accessed without the need for the client program to have access to the class definitions at compile time. An interface is a named set of logically related function members. In C++, an interface is an abstract class with no data members and whose virtual functions are all pure. Thus, an interface provides a published protocol for two programs to communicate. Interfaces are typically used for derivation: a program defines (implements) classes that provide implementations for the interfaces the classes are derived from.

Thereafter, objects are created as instances of these derived classes. Objects instantiated from a derived class implementing particular interfaces are said to "support" the interfaces. An object supports one or more interfaces depending upon the desired functionality.

When a client program desires to share an object, the client program needs access to the code that implements the interfaces for the object (the derived class code). To access the derived class code (also referred to as class code), each class implementation is given a unique class identifier (a "CLSID"). For example, code implementing a spreadsheet object developed by Microsoft Corporation may have a class identifier of "MSSpreadsheet," while code implementing a spreadsheet object developed by another corporation may have a class identifier of "LTSSpreadsheet." A persistent registry in each computer system is maintained that maps each CLSID to the code that implements the class. Typically, when a spreadsheet program is installed on a computer system, the persistent registry is updated to reflect the availability of that class of spreadsheet objects. So long as a spreadsheet developer implements each function member defined by the interfaces to be supported by spreadsheet objects and so long as the persistent registry is maintained, the client program can access the function members of shared spreadsheet objects without regard to which server program has implemented them or how they have been implemented.

SUMMARY OF THE INVENTION

The limitations of prior system are overcome by the present invention, which is an improved method and system for generating and maintaining property sets. In a preferred embodiment, a property set stream is allocated for storing a property set. The property set is generated and stored within the property set stream in three separate parts. First, header information, which identifies the property set and the sections of property definitions, is stored in the property set stream. Second, a section locator array containing sufficient information to locate each section of property definitions within the property set stream is stored in the property set stream. Third, each section of property definitions is stored within the property set stream.

In one embodiment of the invention, each section of properties contains property definitions. Each property definition has a property identifier for identifying the property, a property value containing the data for the property, and a type indicator for indicating the data format of the property value.

In another embodiment, sections of property definitions are stored within a property set stream such that the first section contains base properties and each succeeding section contains extension properties. In addition, each section is uniquely identified so that a program reading the property set stream can interpret sections it understands, while skipping sections it does not recognize.

In another embodiment of the invention, the property set stream is stored in its own structured storage. The property definitions within the property set stream can point to other sibling objects within the structured storage hierarchy. Thus, property sets can define a collection of complex, highly structured values.

DETAILED DESCRIPTION OF THE INVENTION

Embodiments of the present invention provide methods and systems for generating and maintaining property sets. A property of an object is a tagged data value (e.g., a data value with an index for identifying it). Thus, a property set is a collection of tagged values, whose meanings are known to the code that manipulates them. That is, the meaning of the values is known to the degree that the code needs to know it. A property set is a way to structure data than can be manipulated or communicated by independent pieces of code, some of which are generic, and some of which have specific knowledge of a specific property set. For example, code that does not modify a property set, but only reads and displays its values may not need to know very much about the meaning of the values. On the other hand, code that changes the values of particular properties preferably knows the meaning of the properties it is changing.

For example, code may need to modify one property based upon changes to another property to preserve an invariant, such as maintaining the aspect ratio of a rectangle. If one property, such as the height changes, then the width would correspondingly be changed to preserve the aspect ratio invariant. To make these changes, the code would preferably know the meanings of the width and height properties.

Figure 1:
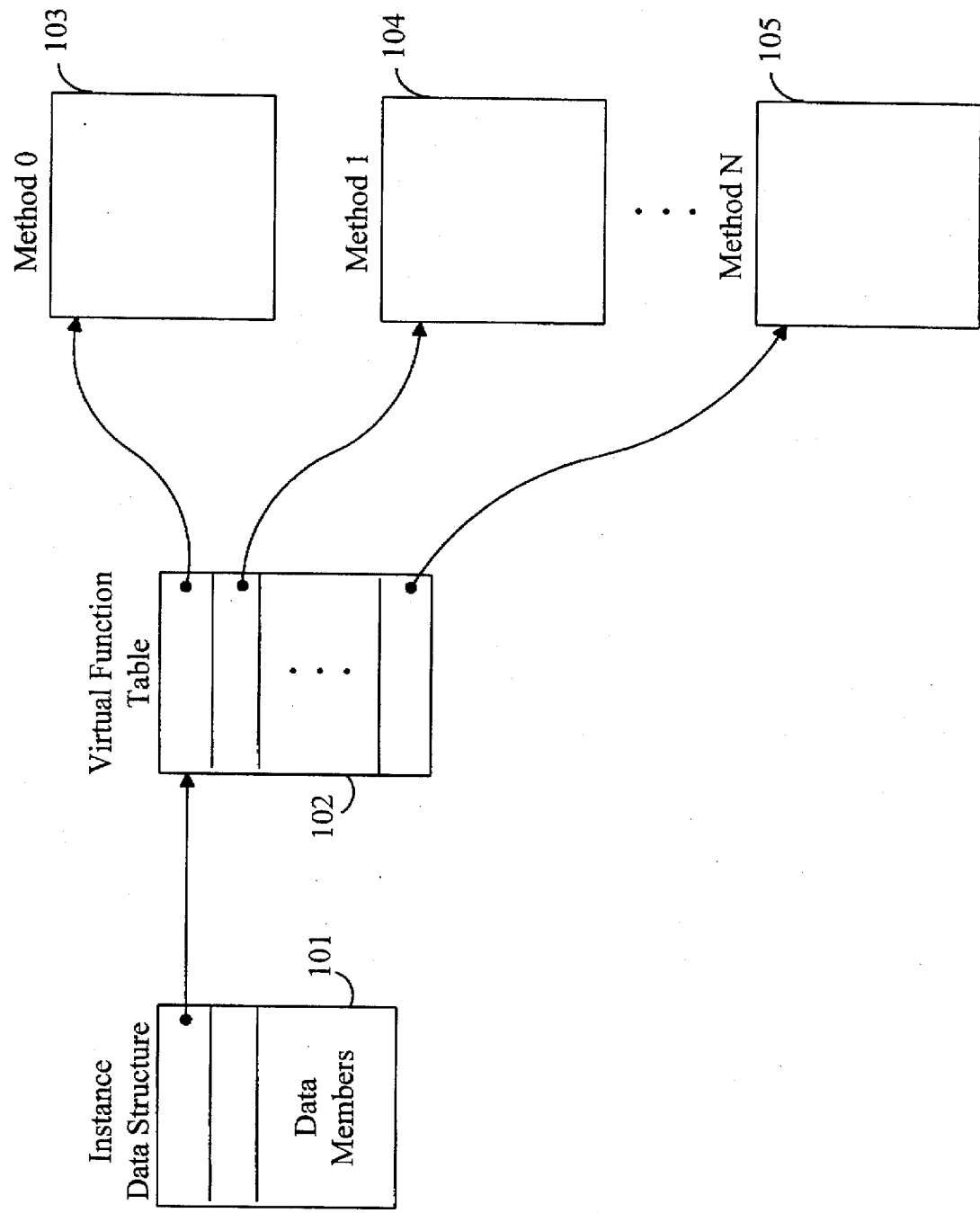
FIG. 1 is a block diagram illustrating typical data structures used to represent an object.
Figure 2:
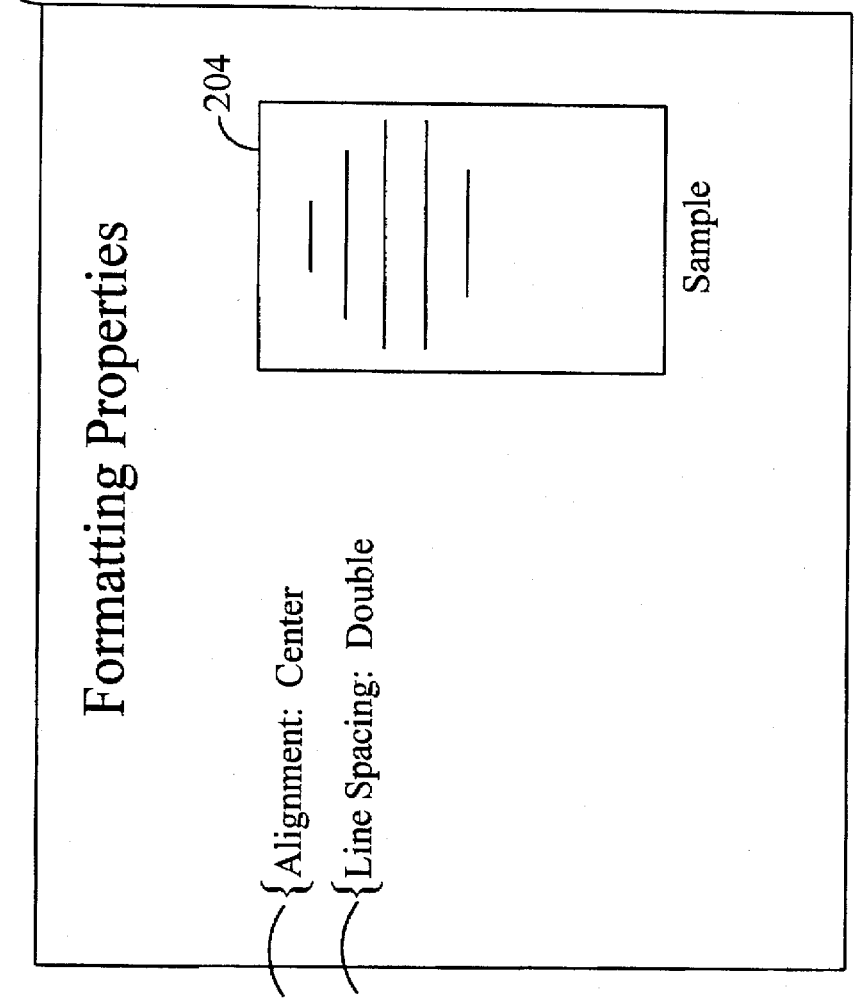
FIG. 2 is an example display of current values for a property set comprising the formatting properties of a paragraph object.

For example, a word processing program may implement paragraph objects that have paragraph formatting properties attached to them. FIG. 2 is an example display of current values for a property set comprising the formatting properties of a paragraph object. A display such as that shown in FIG. 2 is typically generated by a program that can read the values within the property set. The displaying program need not necessarily have knowledge of the meaning of the properties. Item 201 is a display window containing fields of output 202-204, each displaying a property value. Field 202 corresponds to an alignment property whose current value indicates centered output. Field 203 corresponds to a line spacing property whose current value indicates double spacing between lines of text. Field 204 corresponds to a bitmap property, which shows the current state of the combined formatting properties in the property set.

A program may desire to group properties within a property set into subgroups. Embodiments of the present invention refer to the subgroups as sections of a property set. Thus, a property set is also a collection of sections (groups) of tagged values. Grouping properties within a property, set into sections, among other things, allows client programs to understand and process some properties within the property set, while ignoring others. This capability is useful in an environment where multiple client programs share a common (base) property set, but wish to extend the property set for their own purposes.

In a preferred embodiment, the methods and systems of the present invention are implemented on a computer system comprising a central processing unit, a display, a memory, and input/output devices. The preferred embodiment is designed to operate in an object-oriented environment, such as an environment that supports the Microsoft OLE 2.0 ("OLE") protocol established by Microsoft Corporation in Redmond, Wash. One skilled in the art will also recognize that embodiments of the present invention can be practiced in a non-object-oriented environment as well.

In one aspect of the present invention, a preferred embodiment provides a standard structure for representing property sets and methods for generating them. This standard structure is independent of the semantics of the particular properties stored within the structure. That is, the standard structure provides a serialized data format for property sets generally.

Certain characteristics of this standard structure allow client programs to realize several advantages. First, property sets can be stored using a complex hierarchical structure. Second, property sets can be transmitted in the same manner as other data formats because the identity of the format of the data is stored in the structure itself. Third, new formats (data types) for properties can be generated by combining several predefined data types. Fourth, client programs can add properties by either extending an existing property set or by creating a new one. The structure is defined such that client programs can skip over unknown extensions in a property set and preserve them, while extracting the desired property information. Also, extensions to property sets can be defined without concern for conflicts with other client programs defining other extensions. Fifth, property sets are easily movable because they are stored as flat data and the offsets within each section in a property set are relative to that particular section. Sixth, the standard structure allows a server program to define a dictionary of human-readable names to be included in the property set to further describe the contents of the property set. All of the elements or methods needed to realize these advantages are discussed further below.

Specifying Property Sets

Figure 3:
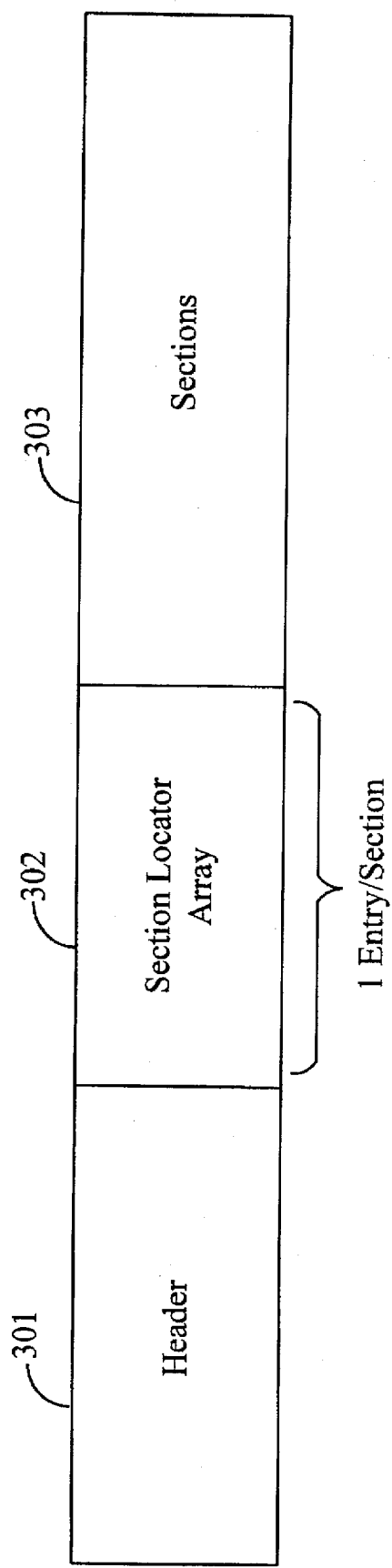
FIG. 3 is an overview block diagram of the standard structure for maintaining a property set.

As mentioned, in a preferred embodiment, property sets are maintained in a standard structure. FIG. 3 is an overview block diagram of the standard structure for maintaining a property set. The structure is comprised of three parts: a header 301 for identifying the property set and locating class code that can display or provide programmatic access to the property values; a section locator array 302 for uniquely identifying each section and providing a pointer to the start of the section within the structure; and a sections part 303 for providing the relevant information for each property contained within each section comprising the property set.

Figure 4:
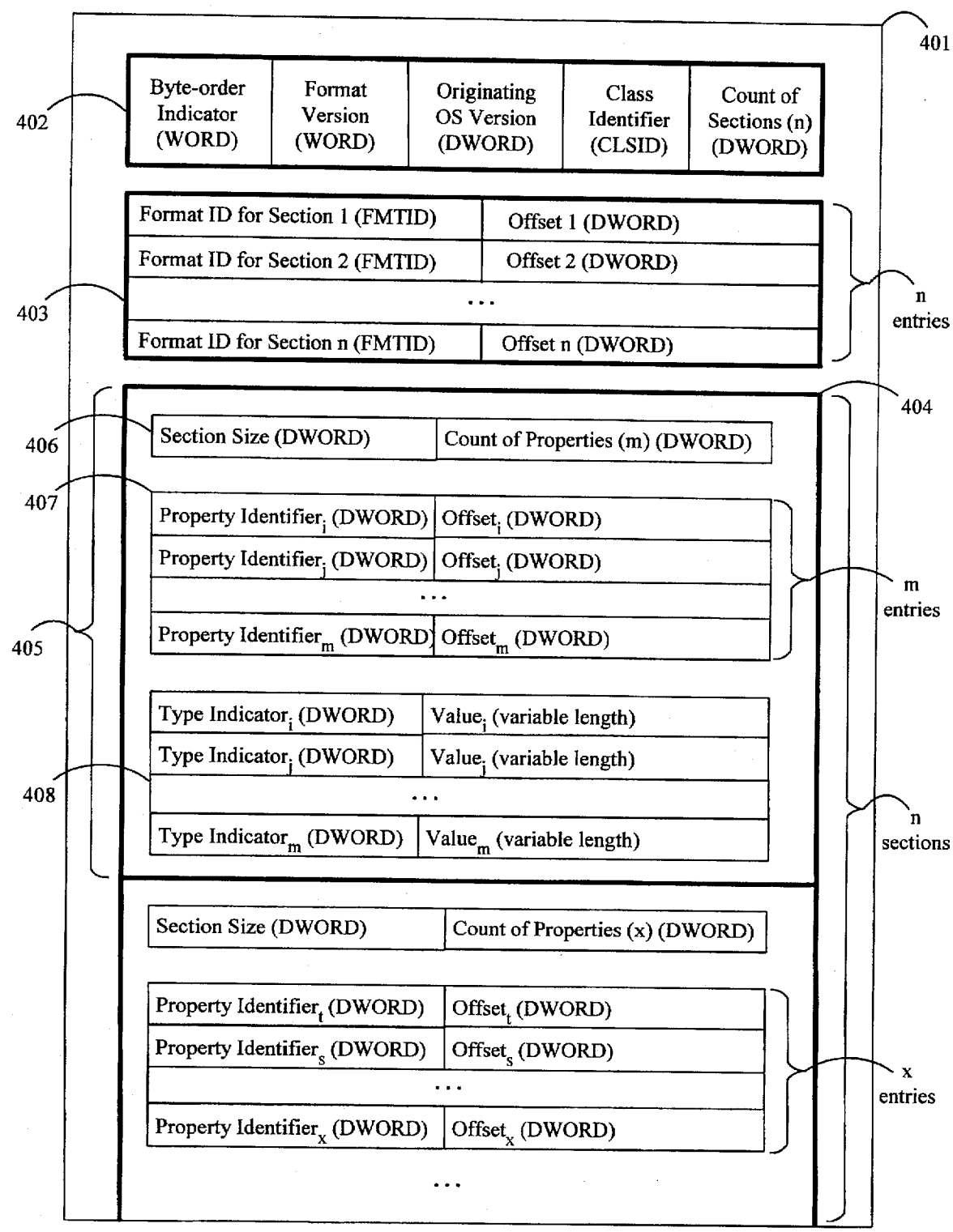
FIG. 4 is a detailed block diagram of the three parts comprising a property set structure.

FIG. 4 is a detailed block diagram of the three parts comprising a property set structure. Data stream 401 (a byte stream) is a flat structure comprising a header 402, a section locator array 403, and one or more sections 404, as discussed with reference to FIG. 3. The header 402 comprises five parts. The byte order indicator, occupying a WORD (e.g., 16 bits) of storage, is an indication of the order in which the bytes are stored within the data stream. This indicator allows generic tools to determine whether the stream is written in Intel byte order (as for an 80×86 computer system) or some other byte order. The format version, occupying a WORD of storage, indicates the version of property set format to which the stream was written. For example, the format version of this preferred embodiment is 0. The originating operating system version, occupying a DWORD (e.g., 32 bits) of storage, indicates the kind of operating system in use when the stream was written. Preferably, this field indicates either a 16-bit Windows operating system, a Macintosh operating system, or a 32-bit Windows operating system. One skilled in the art will recognize that this field could easily be extended to accommodate any operating system. The class identifier field, which occupies the storage required to store a CLSID, indicates the class identifier of class code that can display or provide programmatic access to the property values stored within this stream. If there is no such class code, the server program preferably sets the class identifier to CLSID_NULL. The count of sections field, occupying a DWORD of storage, indicates the number of sections ("n") currently contained within the property set stored within this stream. Preferably, the first section in a property set represents a base set of properties and each subsequent section represents a group of extension properties.

The section locator array 403 contains an entry for each of the "n" sections contained within this stream. Each entry comprises a format identifier ("FormatID") for uniquely identifying the section and an offset for locating the start of the section within the stream. The FormatID occupies an FMTID of storage, which is preferably generated by an underlying operating system tool for generating unique identifiers. In a preferred embodiment, this tool is the same tool as that used to generate globally unique identifiers ("GUIDs") for CLSIDs and other such identifiers. In this embodiment, an FMTID occupies two DWORDs plus eight bytes in sequence. Each offset occupies a DWORD of storage. One skilled in the art will recognize that other sizes for the FormatID and offset, as well as for the other fields of data stream 401, can be accommodated.

The sections part 404 of data stream 401 comprises a section entry for each section of the property set stored in this stream. Thus, in FIG. 4, there are n section entries within sections part 404. Each section in turn comprises three subsections: a section header 406, a property locator array 407, and an array of property type/value pairs 408. The number of entries in arrays 407 and 408 are the same and are determined by the number of properties defined in the section. The section header 406 (occupying two DWORDs of storage) contains a section size and a count of the number of properties stored within the section. The section size includes the space allocated for the indicator itself (a DWORD), enabling programs to easily calculate section offsets within the stream. Note that an empty property set preferably contains at least one section, although the section need only contain a section header with a count of properties equal to zero.

The property locator array 407 and the array of property type/value pairs 408 are in corresponding order. That is, an entry within property locator array 407 indicates information regarding the corresponding entry in array 408. Each entry in the property locator array 407 comprises a pair of values: a property identifier (a "PropertyID") and an offset. The PropertyIDs are DWORD values chosen to uniquely identify a property within the section. Other than PropertyIDs "0" and "1," which are preferably reserved for special uses discussed further below, any DWORD value can preferably be used as a PropertyID. PropertyIDs are not sorted in any particular order, and numbers can be omitted. Thus, client programs preferably do not rely on the order or a range of PropertyIDs within the property locator array 407. The offsets indicate distances from the start of the section to the start of the property type/value pair within array 408. Because the offsets are relative to the beginning of the section, each section can be copied as a block of bytes without any knowledge of the contents of the section. Each offset occupies a DWORD of storage. Thus, the size occupied by the property locator array 407 in stream 401 can be calculated as:

(count of properties)* (DWORD+DWORD).

The array of type/value pairs 408 contains an entry for each property contained in the section and, as discussed, corresponds to the order of the entries within property locator array 407. Each entry in array 408 contains a pair of values: a type indicator for indicating the format of the data and a value of the property containing the data. The type indicator occupies a DWORD of storage, whereas the property value is of variable length depending on its data type. Preferably all type/value pairs begin on 32-bit boundaries. Thus, property values may be followed with null bytes to align the subsequent type/value pair on a 32-bit boundary. However, if a property value is represented as a vector of values, then within the vector of values, each value can be aligned according to its natural alignment as opposed to 32-bit alignment. (As can be seen in Table 1 below, data types VT_I2 and VT_BOOL are the only types with other than 32-bit natural alignment.) For example, a property value with a type indicator VT_I2|VT_VECTOR is stored as a DWORD element count of the elements in the vector, followed by a sequence of packed 2-byte integers with no padding between them. The entire vector is then padded at the end, if necessary, with an additional two bytes to ensure 32-bit alignment of the subsequent type/value pair.

Table 1 lists the preferred type indicators (data formats) for property values.

TABLE 1

| Type Indicator | Code | Value Representation |
|---|---|---|
| VT_EMPTY | 0 | None. A property set with a type indicator of VT_EMPTY has no data associated with it; that is, the size of the value is zero. |
| VT_NULL | 1 | None. This is like a pointer to NULL. |
| VT_I2 | 2 | Two bytes representing a WORD value. This value will be zero-padded to a 32-bit boundary. |
| VT_I4 | 3 | Four bytes representing a DWORD value. |
| VT_R4 | 4 | Four bytes representing a 32-bit IEEE floating point value. |
| VT_R8 | 5 | Eight bytes representing a 64-bit IEEE floating point value. |
| VT_CY | 6 | Eight-byte two's complement integer (scaled by 10,000). This type is commonly used for currency amounts. |
| VT_DATE | 7 | Time format used by many applications, it is a 64-bit floating point number representing seconds since January 1, 1900. This is stored in the same representation as VT_R8. |
| VT_BSTR | 8 | Counted, zero-terminated binary string; represented as a DWORD byte count (including the terminating null character) followed by the bytes of data. |
| VT_BOOL | 11 | Two bytes representing a Boolean (WORD) value containing 0 (FALSE) or −1 (TRUE). This type must be zero-padded to a 32-bit boundary. |
| VT_VARIANT | 12 | Four-byte indicator followed by the corresponding value. This is only used in conjunction with VT_VECTOR. |
| VT_I8 | 20 | Eight bytes representing a signed integer. |
| VT_LPSTR | 30 | Same as VT_BSTR; this is the representation of most strings. |
| VT_LPWSTR | 31 | A counted and zero-terminated Unicode string; a DWORD character count (where the count includes the terminating null character) followed by that many Unicode (16-bit) characters. Note that the count is not a byte count, but a word count. |
| VT_FILETIME | 64 | 64-bit FILETIME structure, as defined by the Windows 32-Bit Operating System:<br>typedef struct FILETIME{<br>  DWORD dwLowDataTime;<br>  DWORD dwHighDateTime;<br>} FILETIME; |
| VT_MISC | 65 | DWORD count of bytes, followed by that many bytes of data. The byte count does not include the four bytes for the length of the count itself; an empty MISC would have a count of zero, followed by zero bytes. This is similar to VT_BSTR but does not guarantee a null byte at the end of the data. |
| VT_STREAM | 66 | A VT_LPSTR (DWORD count of bytes followed by a zero-terminated string that many bytes long) that names the stream containing the data. The real value for this property is stored in an object supporting the IStream interface, which is a sibling to the CONTENTS stream. This type is only valid for property sets stored in the CONTENTS stream of an object supporting the IStorage interface. |
| VT_STORAGE | 67 | A VT_LPSTR (DWORD count of bytes followed by a zero-terminated string that many bytes long) that names the storage containing the data. The real value for this property is |

TABLE 1-continued

| Type Indicator | Code | Value Representation |
|---|---|---|
| | | stored in an object supporting the IStorage interface, which is a sibling to the CONTENTS stream that contains the property set. This type is only valid for property sets stored in the CONTENTS stream of an object supporting the IStorage interface. |
| VT_STREAMED_OBJECT | 68 | Same as VT_STREAM, but indicates that the Stream object named in this property contains a serialized object, which is a CLSID followed by initialization data for the class. The named Stream object is a sibling to the CONTENTS stream that contains the property set. This type is only valid for property sets stored in the CONTENTS stream of an object supporting the IStorage interface. |
| VT_STORED_OBJECT | 69 | Same as VT_STORAGE, but indicates that the Storage object named in this property contains an object. This type is only valid for property sets stored in the CONTENTS stream of an object supporting the IStorage interface. |
| VT_MISC_OBJECT | 70 | An array of bytes containing a serialized object in the same representation as would appear in a VT_STREAMED_OBJECT (VT_LPSTR). The only significant difference between this type and VT_STREAMED_OBJECT is that VT_MISC_OBJECT does not have the system-level storage overhead as VT_STREAMED_OBJECT. VT_MISC_OBJECT is more suitable for scenarios involving numerous small objects. |
| VT_CF | 71 | An array of bytes containing a clipboard format identifier followed by the data in that format. That is, following the VT_CF identifier is the data in the format of a VT_MISC. This is a DWORD count of bytes followed by that many bytes of data in the following format: a LONG followed by an appropriate clipboard identifier and a property whose value is plain text should use VT_LPSTR, not VT_CF to represent the text. Notice also that an application should choose a single clipboard format for a property's value when using VT_CF. |
| VT_CLSID | 72 | A CLSID, which is a DWORD, two WORDS, and eight bytes. |
| VT_VECTOR | 0x1000 | If the type indicator is one of the previous values in addition to this bit being set, then the value is a DWORD count of elements, followed by that many repetitions of the value. When VT_VECTOR is combined with VT_VARIANT the value contains a DWORD element count, a DWORD type indicator, the first value, a DWORD type indicator, the second value, and so on. Examples: VT_LPSTR|VT_VECTOR has a DWORD element count, a DWORD byte count, the first string data, a DWORD byte count, the second string data, and so on. VT_I2|VT_VECTOR has a DWORD element count followed by a sequence of two-byte integers, with no padding between them. |

The meaning of each type indicator and its size is described in the Value Representation column in Table 1. Most of the table entries are self-explanatory, however, a few merit additional explanation.

First, there are several types of property values that are stored as complex hierarchical structures within the object-oriented environment. These type indicators are VT_STREAM, VT_STORAGE, VT_STREAMED_OBJECT, VT_STORED_OBJECT, and VT_MISC_OBJECT. These types of property values are preferably only used when a property set stream is stored within its own hierarchical object structure. The storage of property set streams is discussed in greater detail below. At this point, it is sufficient to note that these types are preferably available in some situations and not others.

Second, the VT_CF type indicator allows a property value to be stored in a clipboard format (e.g., an operating system defined format for data to be exchanged using, for example, an operating system supplied clipboard). The property value corresponding to a VT_CF type indicator should be arranged as follows: a count of the bytes that follow, a tag indicating the kind of clipboard format identifiers used (see Table 2 below), an array of bytes representing the particular clipboard format identifier, and the data in the specified clipboard format.

Table 2 lists possible values for the tag indicating the kind of clipboard format identifiers.

TABLE 2

| First Four Bytes | Following Value Size | Meaning |
|---|---|---|
| -1L | 4 bytes (DWORD) | Windows built-in Clipboard Format Value (e.g., CF_TEXT). |
| -2L | 4 bytes (DWORD) | Macintosh Format Value (4-byte tag). |
| -3L | 16 bytes (Format ID) | An FMTID. |
| Length of String | Variable | Clipboard format name that has been previously registered with the underlying operating system. |
| 0L | Zero | No format name. |

As shown in Table 2, there are five kinds of clipboard format identifiers that can occur in VT_CF values: Windows clipboard format values corresponding to clipboard formats on the Windows operating system, Macintosh format values corresponding to clipboard formats on the Macintosh operating system, FMTIDs, clipboard format names previously registered, and no format name. One skilled in the art will recognize that the kinds of clipboard format identifiers can vary and that the VT-CF value can be extended to other operating systems.

Third, the VT_VECTOR type indicator used in conjunction with the VT_VARIANT type indicator enables a program to arbitrarily extend the preferred data types. Property sets are designed to be partially self-describing so that code that does not recognize everything in a property set can at least read the types of the values contained within the set. A program desiring to define a new type can do so by creating a structure which is essentially a vector of varying data, where each data entry in the vector is self-describing. This self-describing nature is possible became the VT_VARIANT data type includes as its first element another data type indicator.

For example, if a program desires to store a special kind of packed data structure consisting of a 32-bit value, followed by 16 bits of flags, followed by another 16-bit value, the program can define a structure as follows:

```
typedef struct tagPACKED
{
    DWORD     dwValue1;    32 bit value
    WORD      wFlag;       16 bits of flags
    WORD      wValue2;     16 bit value
} PACKED:
```

This 64-bit data structure can then be stored, using the VT_VARIANT|VT_VECTOR data type, as the following property value:

```
DWORD     // dwTypeIndicator = VT_VARIENT | VT_VECTOR;
DWORD     // dwElementCount = 3;
DWORD     // dwTypeIndicator = VT_I4;
DWORD     // dwValue1
DWORD     // dwTypeIndicator = VT_I2;
WORD      // wFlag;
DWORD     // dwTypeIndicator = VT_I2;
WORD      // wValue2;
```

As shown above, the type indicator of the "new" format is VT_VARIANT|VT_VECTOR. The property value consists of an element count (as required by the VT_VECTOR type indicator) followed by three elements. The first element has a type indicator specifying a 32-bit integer type followed by the first value in the data structure. The second element has a type indicator specifying a 16-bit integer followed by the second value in the data structure. The third element has a type indicator indicating a 16-bit integer followed by the third value in the data structure.

Figure 5:
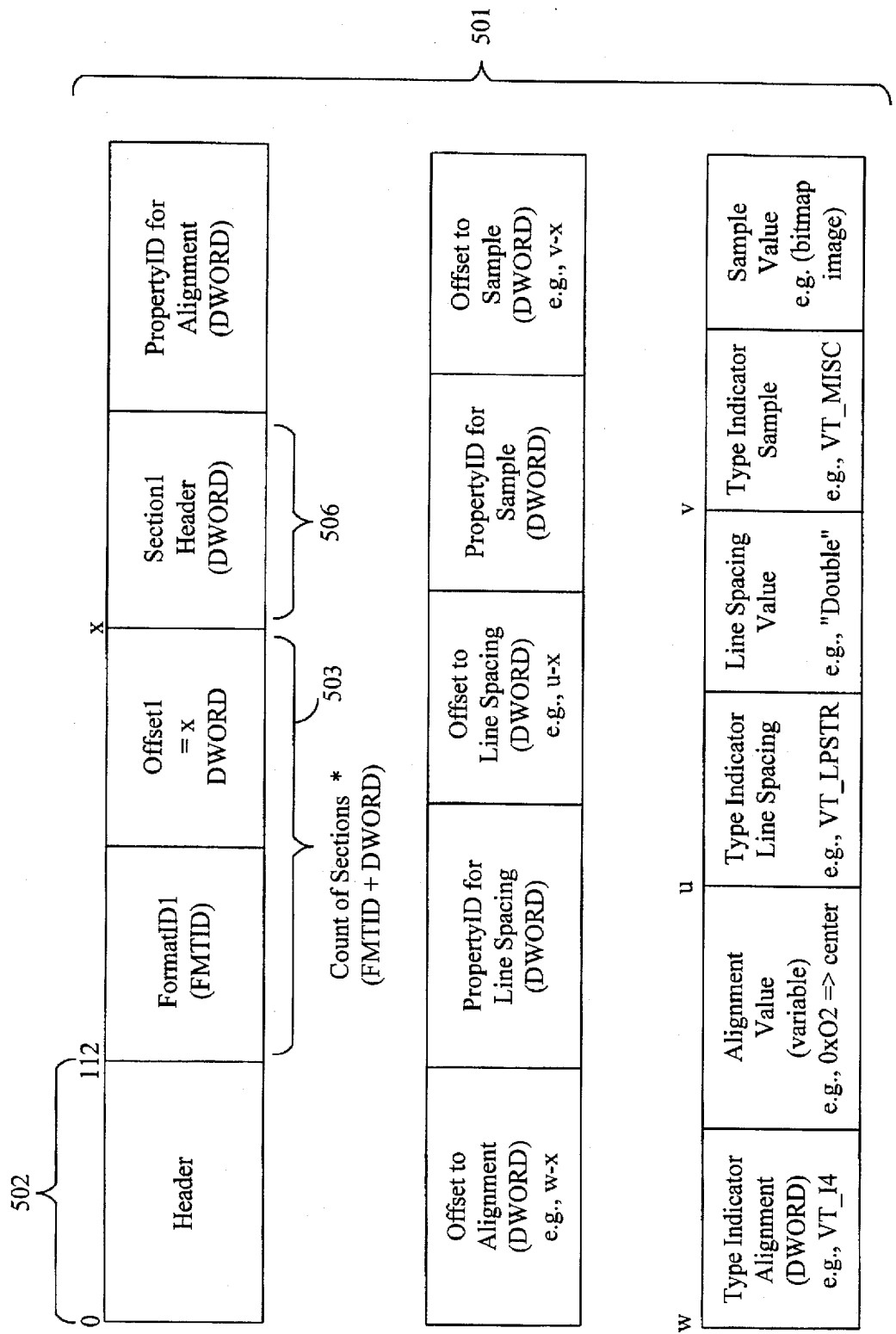
FIG. 5 is a block diagram of the property set stream corresponding to the formatting property set of the paragraph object discussed with reference to FIG. 2.

At this point, it is useful to examine how the standard structure is used in an example property set. FIG. 5 is a block diagram of the property set stream corresponding to the formatting property set of the paragraph object discussed with reference to FIG. 2. Recall that the formatting property set of the paragraph object as described earlier contains three properties: an alignment property, a line spacing property, and a picture sample of the combined paragraph format. In FIG. 5, property set stream 501 comprises three parts numbered according to their corresponding parts in FIG. 4. Header 502 has five fields (not shown) as described with reference to FIG. 4, with the section count field indicating that there is presently one section in the property set. The section locator array 503 has one entry corresponding to section 1. The first field of this entry is a unique FormatID identifying the section 1 group of properties. The second field is an offset (pointing to address "x") where section 1 begins in property set stream 501, relative to the beginning of the stream. As labeled in FIG. 5, section 1 begins at absolute address "x".

Section 1 occupies the remainder of the property set stream and is organized as follows. First, the section 1 header 506 contains the size in bytes of the entire section (the size=the end of stream address—absolute address "x" in the case where only 1 section exists). Section 1 header 506 also contains a property count indicating that there are three properties in this section (neither of which are shown). Second, the property locator array follows and contains three elements. The first element contains the PropertyID for the alignment property followed by an offset to the alignment property type/value pair in property set stream 501. Recall that the offsets in this array are relative to the beginning of this section (i.e., relative to absolute address x). The second element contains the PropertyID for the line spacing property followed by an offset from the beginning of the section to the location of the line spacing property type/value pair. The third element contains the PropertyID for the sample property followed by an offset from the beginning of the section to the location of the sample property type/value pair. Section 1 also contains a third part, an array of type/value pairs corresponding to the PropertyID/offset pairs. The type indicator for the alignment property is located at absolute address "w." In this example, the value for the alignment property (center) is stored as a number. The corresponding type indicator is VT_I4 to indicate a 32-bit value. The type indicator for the line spacing property is stored at absolute address "u." In this example, the value of the line spacing property is stored as the string "Double." Thus, a corresponding type indicator for the line spacing property is VT_LPSTR. The type indicator for the property referred to as "Sample" is stored at absolute address "v". In this example, the value of the sample property is stored as a bitmap image. Thus, a corresponding type indicator for the Sample property is a VT_MISC for storing a bitmap. (Alternatively, the Sample property could be stored in a VT-CF clipboard format.)

Figure 6:
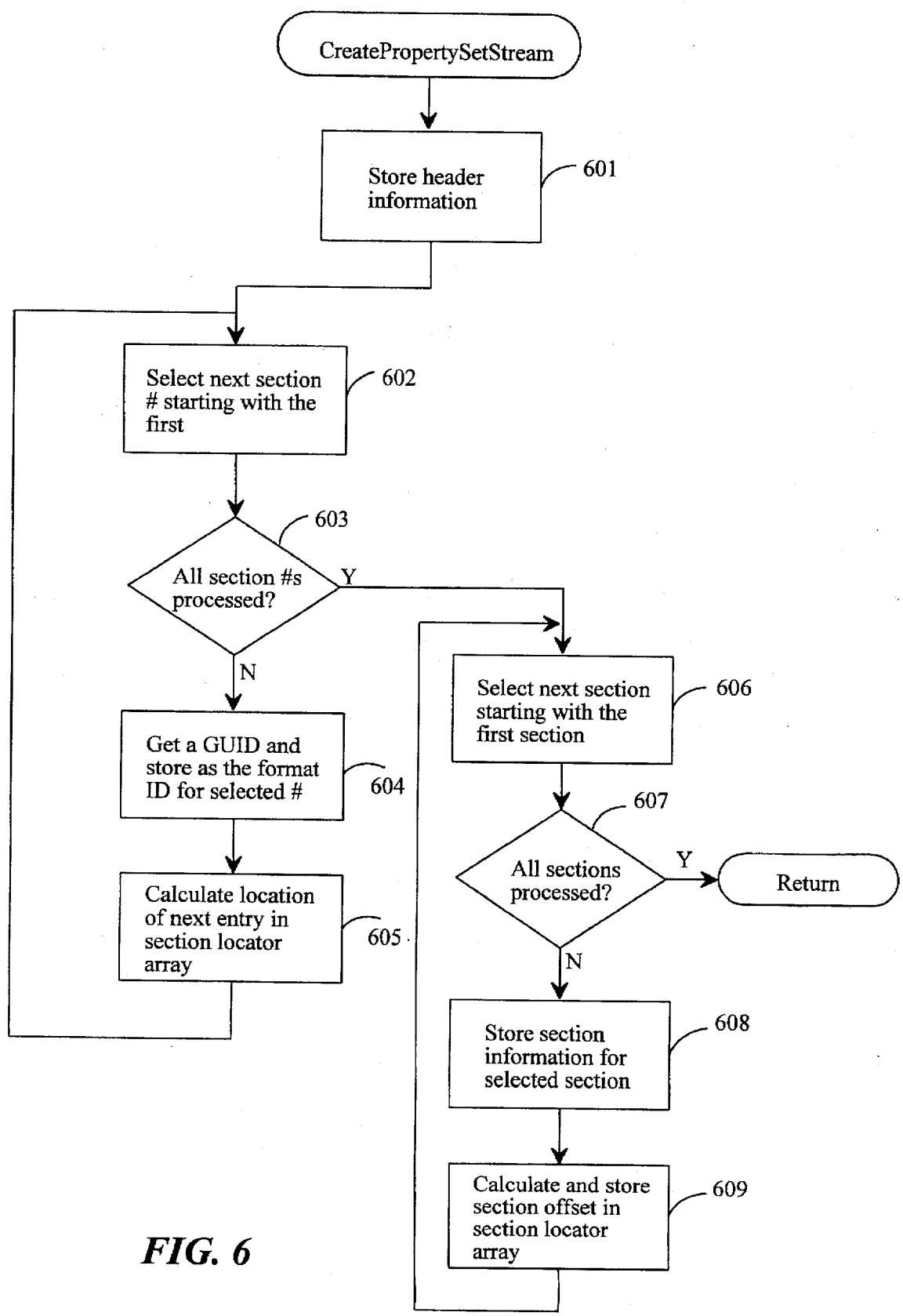
FIG. 6 is an overview flow diagram of a typical routine for creating a property set stream given existing groups of properties.
Figure 7:
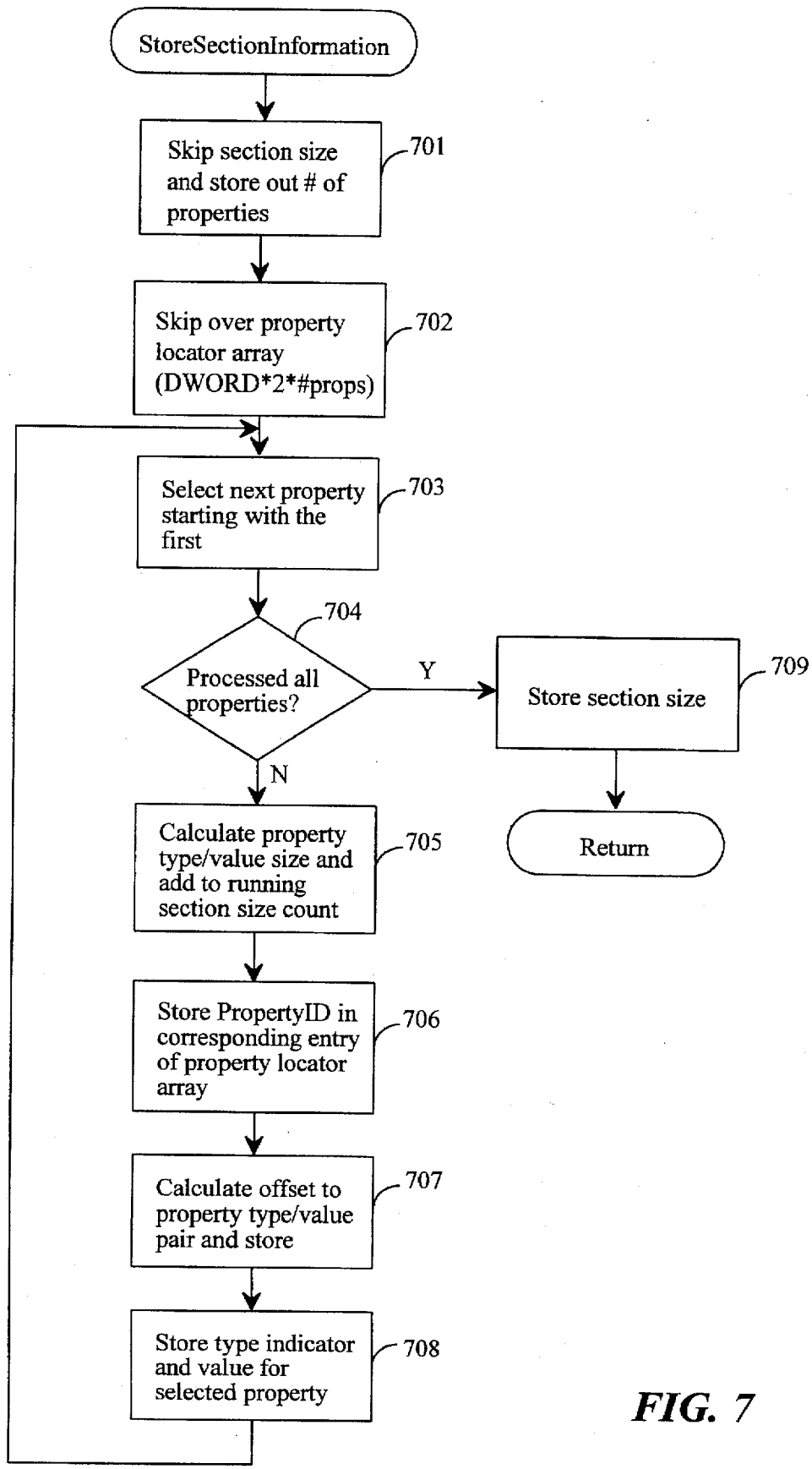
FIG. 7 is a flow diagram of a typical routine for storing the section information for a particular section in a property set stream.

The procedure for creating a property set stream such as that shown in FIG. 5 is fundamentally application specific because it depends upon how the properties are stored internally by the program. However, programs desiring to create property set streams typically follow a set of steps for generating the stream. FIGS. 6 and 7 are example routines for setting up a property set stream given an already created group or groups of properties. These figures assume that the created properties are stored for internal use in a more traditional programming style data structure such as a list data structure or other such data structure. One skilled in the art will recognize that, if the groups of properties are instead stored as a property set object and property section objects, then instead of the steps identified below, the program would preferably invoke methods on these objects requesting them to copy themselves out to a given property set stream.

FIG. 6 is an overview flow diagram of a typical routine for creating a property set stream given existing groups of properties. The routine stores the header information, creates and stores a unique FormatID for each group (section) of properties, stores the section information for each section, and stores the section offset for each section in the section locator array once it has determined the section size. In step 601, the routine stores the header information, including the CLSID of a program capable of displaying or providing programmatic access to the stream (if one exists), and the number of sections to be stored. In steps 602–605, the routine fills in the FormatID fields of the section locator array. Specifically, in step 602, the routine selects the next section number starting with the first section number. In step 603, the routine determines whether it has created an entry in the array for all of the sections and, if so continues in step 606, else continues in step 604. In step 604, the routine obtains a globally unique identifier from the underlying system (a GUID) and stores this value as the FormatID of the current entry in the section locator array. In step 605, the routine calculates the location of the next available entry in the section locator array and returns to step 602. In steps 606–609, the routine stores each section of properties in the property set stream. Specifically, in step 606, the routine selects the next section starting with the fast section. In step 607, the routine determines whether all the sections to be added to the stream have been processed and, if so returns, else continues in step 608. In step 608, the routine stores the section information for the current selected section. This step is further expanded in FIG. 7. In step 609, the routine calculates and stores the offset for the selected section in the corresponding entry in the section locator array and returns to step 606.

FIG. 7 is a flow diagram of a typical routine for storing the section information for a particular section in a property set stream. The routine stores each property type and value, keeping track of the total section size and the offsets of the property type/value pairs. In step 701, the routine stores out the number of properties contained in the section, leaving room for the total section size. In step 702, the routine reserves space for the property locator array. In steps 703–708, the routine processes each property, updating the property locator army as information becomes available. Specifically, in step 703, the routine selects the next property in the section starting with the first property. In step 704, the routine determines whether it has processed all properties within the section and, if so, continues in step 709, else continues in step 705. In step 705, the routine calculates the size of the property type/value pair and adds this value to a running count of the section size. In step 706, the routine stores the PropertyID for the selected property in the corresponding entry of the property locator array. Thus, for example, a property stored in the second entry of the array of type/value pairs has its corresponding entry as the second entry of the property locator array. Recall that PropertyIDs need not appear in order. In step 707, the routine calculates and stores the offset of the selected property type/value pair. In step 708, the routine stores the type indicator and value for the selected property and returns to step 703. In step 709, the routine stores the total section size in the section header and returns.

Extending Existing Property Sets

In addition to creating a new property set stream for a group of properties, a program can extend an already existing property set by adding a new section to a property set stream. An extension to an existing property set can be defined by allocating a new FormatID and new PropertyIDs that do not conflict with the base group of properties (the properties stored in the first section). Preferably, the first section in a property set stream identifies the base group of properties for the property set, and succeeding sections define extensions of the preceding sections. Also, preferably the PropertyIDs chosen for properties in an extended group do not conflict with the property identifiers chosen for properties in the preceding sections. Using this convention, several extensions can be defined by different programs, such extensions having potentially conflicting PropertyIDs. However, because there is a unique FormatID for every extension, these independently defined groups of properties won't Conflict in practice. (At any one time, the property set stream will contain preferably sections with PropertyIDs that do not conflict.) By extending property sets in this manner, client programs can skip over extension sections they do not understand (as identified by the FormatID for the section), but still access properties in the base section and any other extension section that the client program understands.

When extending an existing property set, the new section information and appropriate entries in the section locator array are added to the property set stream. A program accomplishes this task by changing the section count in the header, moving the currently defined sections to make space for another entry in the section locator array, inserting a new FormatID and offset for the new section in the section locator array, adding the section information corresponding to the extension properties in a new section, and updating the section offsets in the section locator array to reflect the new locations of any previously existing sections. Note that because all offsets within a section are relative to the beginning of the section, the sections can be copied as byte arrays without any translation of internal structure or updating of internal offsets. One skilled in the art will recognize that this procedure assumes that a stream can be indefinitely extended. Alternatively, a new stream can be allocated and the relevant parts of the existing stream copied over at appropriate points to create the new extended stream.

Figure 8:
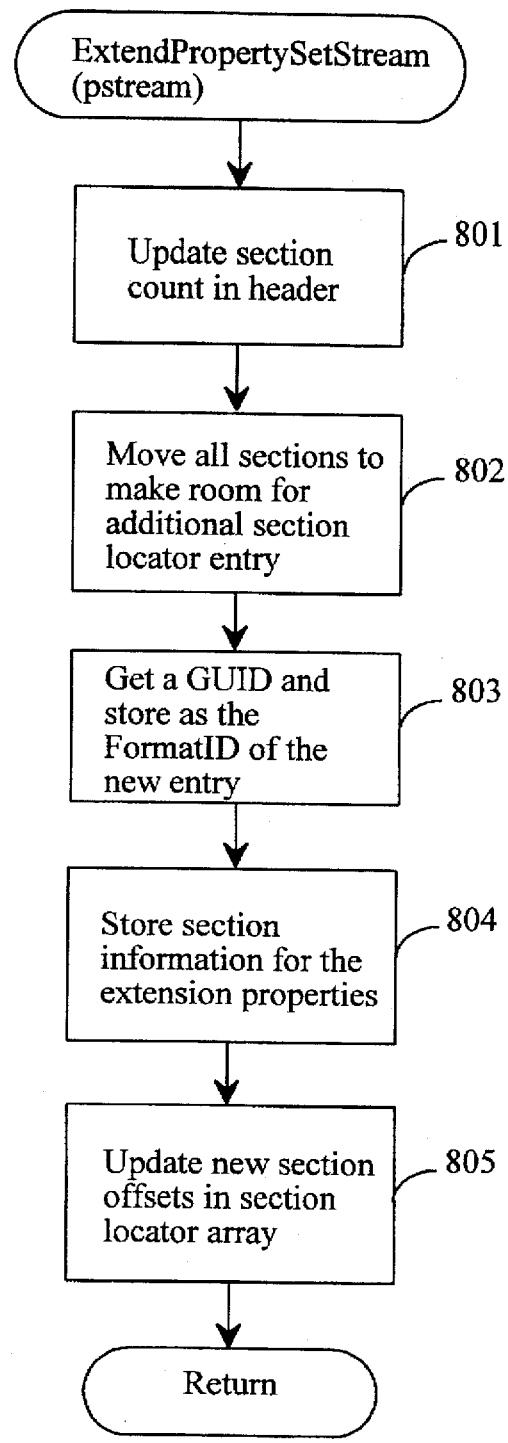
FIG. 8 is a flow diagram of a typical routine for extending an existing property set stream.

FIG. 8 is a flow diagram of a typical routine for extending an existing property set stream. This routine assumes that the program has an already existing group of properties to be added as a new section to the existing stream and that the stream can be appropriately extended. The routine has one input parameter, pstream, a pointer to an existing property set stream. Specifically, in step 801, the routine updates the section count in the property set stream header (see, e.g., structure 402 in FIG. 4). In step 802, the routine allocates enough space for another entry in the section locator array and moves all of the section definitions down further in the stream to make room for a new entry in the section locator array (see, e.g., structure 403 in FIG. 4). In step 803, the routine obtains a unique FormatID preferably from the underlying system, and stores it as the FormatID of the new entry of the section locator array. In step 804, the routine allocates space for and stores all of the section information for the extension properties (e.g., see, FIG. 7). In step 805, the routine updates the offset in the section locator array and returns.

Figure 9:
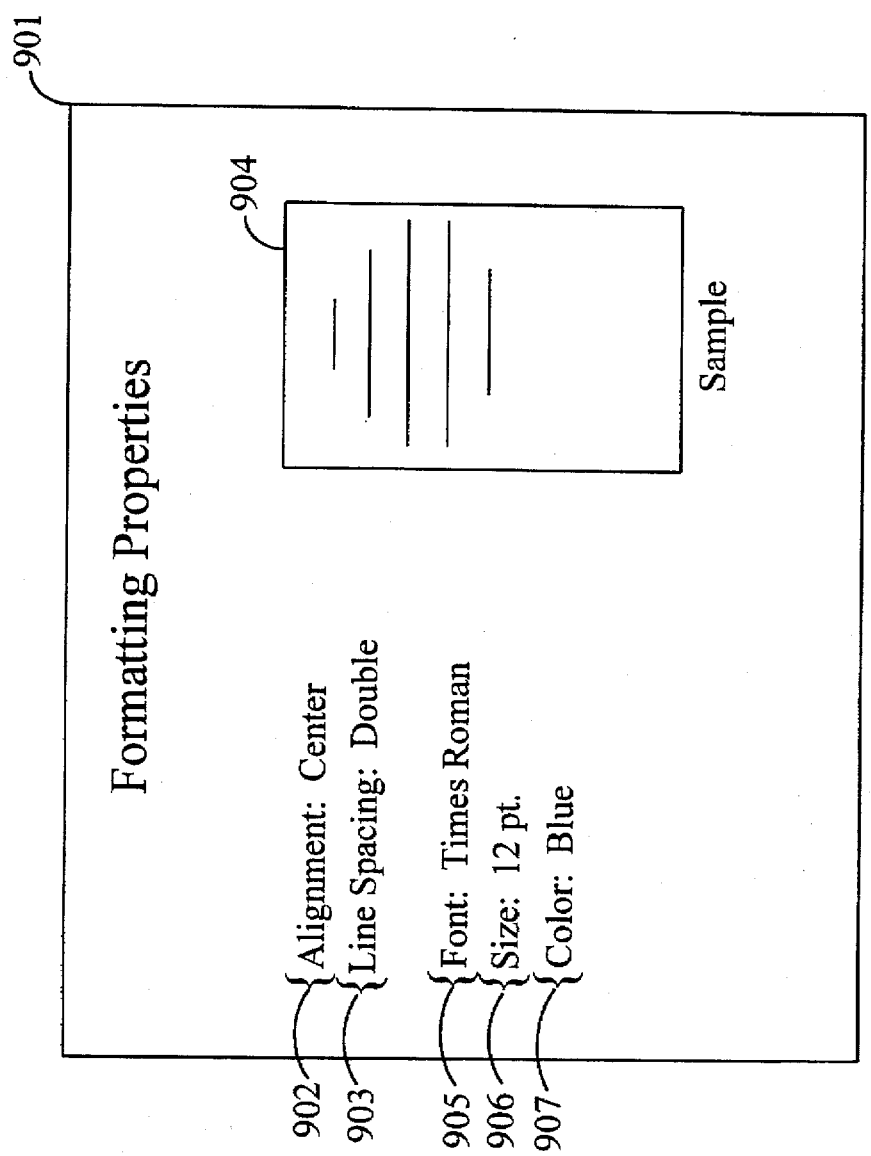
FIG. 9 is an example display of current values for a property set comprising the formatting base and extension properties of a paragraph object.

As a specific example of using this extension capability, the property set discussed with reference to FIG. 2 can be extended to add properties to the existing base property, set of formatting properties. For example, formatting properties pertaining to the font characteristics of a paragraph can be added to the existing formatting properties of a paragraph object. FIG. 9 is an example display of current values for a property set comprising the formatting base and extension properties of a paragraph object. Item 901 is a display window containing fields of output 902–907, each displaying a property value. Fields 902–904 display properties belonging to the base property set shown in FIG. 2. Fields 905–907 display a group of extension properties. Field 905 corresponds to a typeface property whose current value indicates a "Times Roman" font. Field 906 corresponds to a font size property whose current value indicates a 12-point font. Field 907 corresponds to a font color property whose current value indicates blue. In the extended property set shown in FIG. 9, the formatting properties for a paragraph object include all of the properties displayed in fields 902–907.

Figure 10:
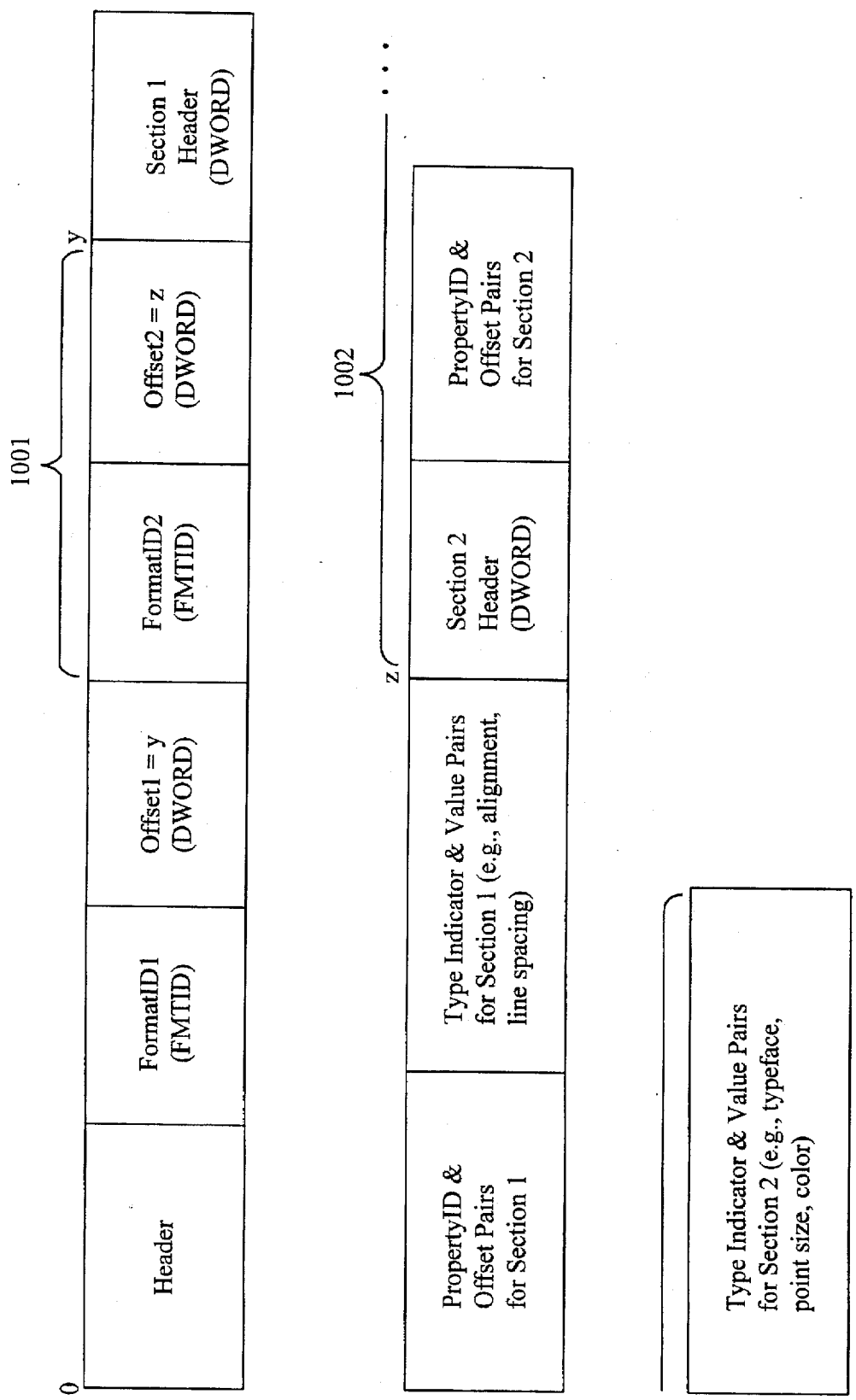
FIG. 10 is a high level block diagram illustrating the addition to an existing property set stream of a new section corresponding to the extended properties shown in FIG. 9.

FIG. 10 is a high level block diagram illustrating the addition to an existing property set stream of a new section corresponding to the extended properties shown in FIG. 9. In FIG. 10, a new entry 1001 has been added to the section locator array. New entry 1001 contains a new FormatID corresponding to section 2 and an offset corresponding to the address of section 2 within the stream (address "z"). Note that the section 1 information has been moved and that the offset for section I in the section locator array has been changed to reflect the new location (address "y"). Section 1 information follows the new entry in the section locator array and includes all of the information discussed with reference to FIG. 5. At address location "z", a new section 1002 has been added to correspond to the three new properties of typeface, point size, and color. As with other sections, section 2 contains a section header, followed by a property locator array containing PropertyIDs and offset pairs for the three new properties, and followed by an array of type/value pairs with three entries corresponding to the new properties.

Special PropertyIDs

As mentioned earlier, two PropertyIDs are preferably reserved for special purposes. PropertyID "0" is reserved for property set dictionaries containing human-readable names describing the properties in the property set. PropertyID "1" is reserved for indicating the character set used in the property set.

More specifically, PropertyID "0" is reserved for an optional dictionary of human-readable names for the property set. Preferably, not all of the names of the properties in the set need to appear in the dictionary. The dictionary in PropertyID "0" can omit entries for properties assumed to be universally known by client programs that manipulate the property set. Typically, names for the base properties (the properties in section 1) for widely accepted standards are omitted. However, extensions or special purpose property sets preferably include dictionaries for use by tools that display the properties in the property set without knowledge of their meaning. If a dictionary exists, it preferably contains at least one entry corresponding to the name of the property set.

PropertyID "0" is anomalous in that it preferably does not have a type indicator. Instead, the DWORD typically used to store the type indicator in the array of type/value pairs is used to indicate the number of entries in the dictionary. The property value corresponding to PropertyID "0" is an array of PropertyID/string pairs, where the first entry in the array corresponds to the name of the entire property set. That is, the first entry contains a pair of values: a PropertyID of zero and a string name corresponding to the name of the property set. The remaining entries in this array are the PropertyIDs and corresponding names of the properties. Although not indicated in the type indicator field for PropertyID "0," the dictionary property value is stored as type VT__MISC|VT__ VECTOR. Each MISC structure in the vector contains a DWORD count of bytes, followed by a DWORD indicating the PropertyID, followed by the name corresponding to that PropertyID. Specifically, PropertyID "0" is preferably in the following format:

DWORD count of the number of dictionary entries (PropertyID/string pairs); and an unsorted sequence of pairs of the form:

DWORD byte count, DWORD PropertyID, LPSTR property name.

For example, a dictionary corresponding to the formatting property set of the paragraph object discussed earlier could include a humanreadable name of "Formatting" for the entire property set, "Alignment" for the alignment property, and "Line Spacing" for the line spacing property. Table 3 shows a portion of the byte stream for a property set section corresponding to the formatting properties example that includes a dictionary.

TABLE 3

| (start of section) | |
| --- | --- |
| DWORD | size of section |
| DWORD | number of properties in section |
| (start of property locator array) | |
| DWORD | PropertyID = 0 |
| DWORD | Offset to PropertyID0 |
| DWORD | PropertyID (e.g., PID__Alignment) |
| DWORD | Offset to PropertyID |
| DWORD | PropertyID (e.g., PID__LineSpacing) |
| DWORD | Offset to PropertyID |
| DWORD | PropertyID (e.g., PID__Sample) |
| DWORD | Offset to PropertyID |
| (start of property type/value pairs) | |
| DWORD | Number of dictionary entries (=4) |
| DWORD | PropertyID (=0) |
| DWORD | Length of string (=11) |
| Char sz[11] | String (="Formatting") |
| DWORD | PropertyID (=PID__Alignment) |
| DWORD | Length of string (=10) |
| Char sz[10] | string (="Alignment") |
| | (dictionary entries continue) |
| (start of next property type/value pair) | |
| DWORD | Type indicator (e.g., VT__I4) |
| DWORD | Value (e.g., 0 × 02 = center) |

PropertyID "1" is reserved as an indicator of the character set (known as a code page in the Windows operating system) that was used to create the strings in the property set. Preferably, all string values within a property set are stored using the same character set. If a program does not understand this indicator, it preferably does not modify the character set property. When a program that is not the author of a property set changes a property of type string, it preferably examines the character set property and either writes the changed string values out consistently or rewrites all of the other string values in the property set to a new character set and modifies the value of PropertyID "1" accordingly. PropertyID "1" begins with a VT__I2 type indicator.

Storing Property Sets

In a preferred embodiment, the underlying operating environment provides structured storage for storing objects. In the Microsoft OLE 2.0 environment, persistent storage for objects is provided through IStorage and IStream interfaces. These interfaces are discussed in detail in U.S. patent application Ser. No. 07/909,533, entitled "Method and System for Storing and On-Demand Loading of Objects," which is hereby incorporated by reference. For the purposes of understanding the present invention, the IStorage interface is supported by storage objects, which can contain other storage objects or stream objects. Stream objects are objects that support the IStream interface. The IStorage interface defines methods, among others, for creating and opening child storage and stream objects and for committing transactions to the storage object. The IStream interface defines methods, among others, for reading and writing stream objects. Roughly speaking, the IStream and IStorage interfaces as implemented by specific object implementations support the storage of objects in an analogous manner to the way files and directories support the hierarchical storage of files in a file system.

Typically, objects within the Microsoft OLE 2.0 environment are stored in storage objects that support the IStorage interface even if the object only makes use of one stream within the storage object (for its persistent data). Preferably, a property set is stored as an object connected to the same storage object to which the object "owning" the properties is connected (the "parent" storage object). That is, in an abstract sense, both the object and its property sets are connected to the same parent storage object.

Within this type of structured storage system, a property set can be stored as either a storage object supporting the IStorage interface or as a stream object supporting the IStream interface. Preferably, the name of the object used to store a common property set (defined by the underlying object-oriented environment) that can be shared among programs is prepended with the byte value "\0×05" for recognition purposes. One skilled in the art will recognize that other names are possible and that names prepended with values reserved by the underlying object-oriented environment will preferably be used as defined by the underlying environment. In the case where a property set is stored as a storage object the actual property set stream (serialized data) is stored in a child stream object preferably named "CONTENTS." If the property values stored within the "CONTENTS" stream object represent complicated data structures requiring additional structured storage, then these additional storage or stream objects are stored as children of the property set storage object. For example, a property value might be another object. One purpose in storing such complex values within a single property set storage object is to keep all of the property values separate from the other objects relating to the parent storage object.

Figure 11B:
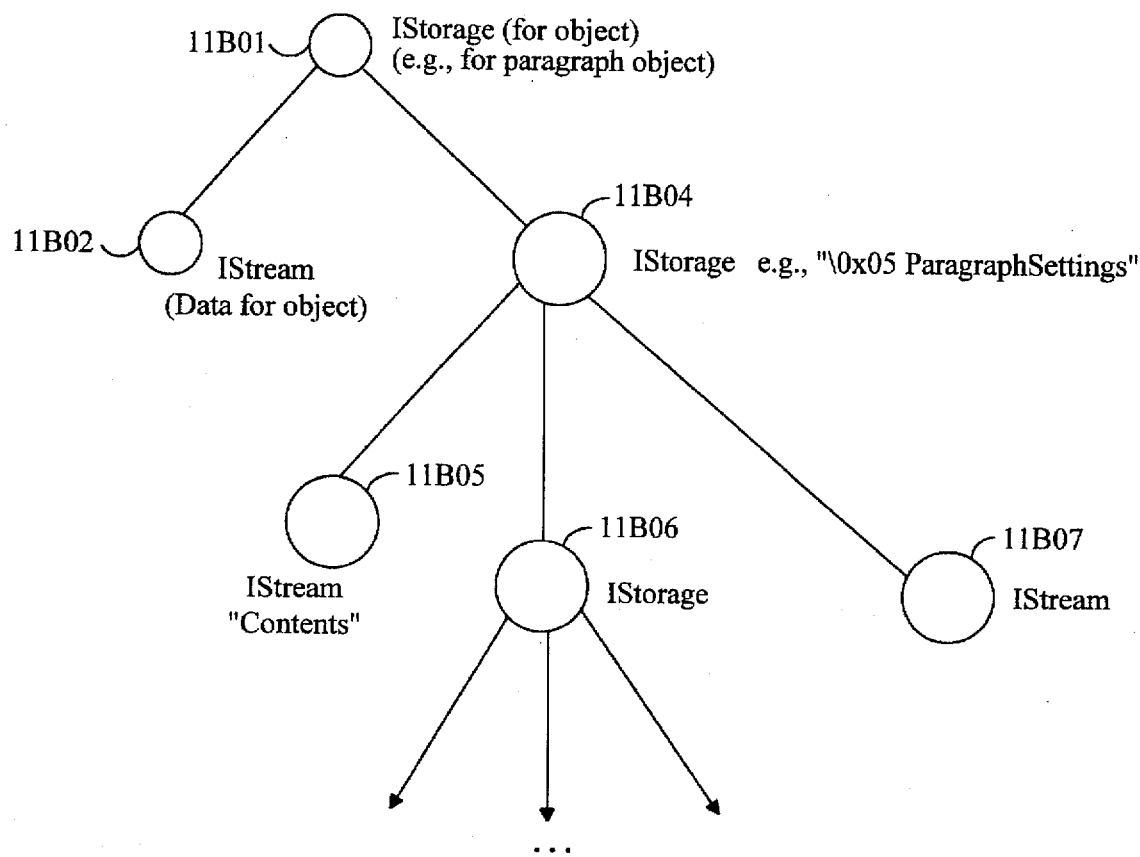
FIG. 11B is a block diagram of the structured storage layout for a property set created as an instance of a storage object.
Figure 11A:
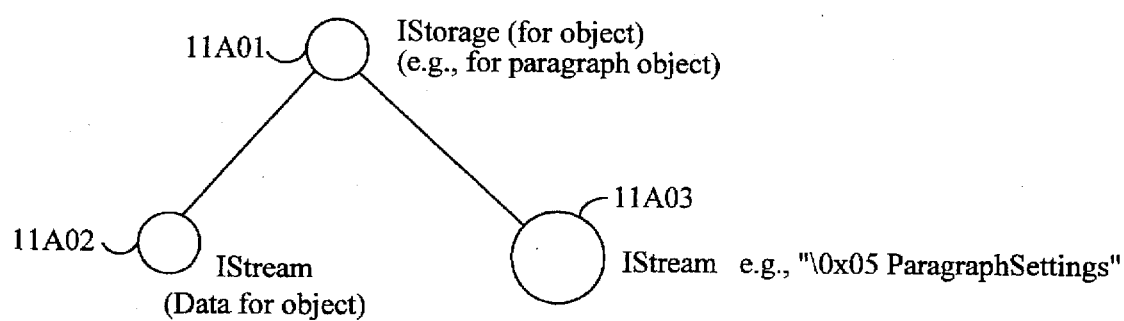
FIG. 11A is a block diagram of the structured storage layout for a property set created as an instance of a stream object.

FIGS. 11A and 11B depict these two scenarios for storing property sets. FIG. 11A is a block diagram of the structured storage layout for a property set created as an instance of a stream object. The structured storage layout comprises three objects possibly connected to other objects within a storage hierarchy. The objects in FIGS. 11A and 11B are labeled with an appropriate interface name to indicate that the circle represents an object supporting that interface. Storage object 11A01 is the parent storage object for the particular object of interest. Stream object 11A02 stores the data for the object. Stream object 11A03 stores a property set stream belonging to object 11A01. For example, the structured storage objects shown in FIG. 11A can be mapped to the paragraph object of the example discussed with reference to FIGS. 3 and 5. Accordingly, the stream object 11A02 represents the data for the paragraph object, and stream object 11A03 is the storage for the formatting property set as discussed in the example.

FIG. 11B is a block diagram Of the structured storage layout for a property set created as an instance of a storage object. Objects 11B01 and 11B02 represent the same objects as 11A01 and 11A02 described with reference to FIG. 11A. Storage object 11B04 provides storage for a property set belonging to object 11B02. As shown, storage object 11B04 points to three other structured storage objects. Stream object 11B05, labeled "CONTENTS," is the equivalent of stream object 11A03 in FIG. 11A. This stream object stores the property set stream data.

Storage object 11B06 and stream object 11B07 are displayed to show that other sibling objects can be stored within the structured storage allocated for a property set. These objects are preferably objects referenced by a property value within the property set stream 11B05. As discussed earlier, several type indicators are available for storing complex property values. The type indicators VT_STREAM, VT_STORAGE, $VT\_STREAM_{13}$ OBJECT, VT_STORAGE_OBJECT, and VT_MISC_OBJECT are preferably only utilized when a property set is stored in a storage object as shown in FIG. 11B. As indicated in Table 1, these type indicators specify that the corresponding property value is stored in a sibling stream object or storage object. Storage object 11B06 and stream object 11B07 represent such sibling objects used to represent complex property values.

Example Uses of Property Sets

Many uses exist for property sets generated by the present invention beyond the examples discussed so far. First, special property sets can be created to support standardization efforts. For example, the preferred embodiment provides a standard property set (a base set) for document summary information.

This document summary information property set is an example of a common property set shared among programs that manipulate documents. A client program, using the embodiments described, can extend this base set of properties for its own purposes.

Table 4 lists the property names for the Document Summary Information property set, along with their respective PropertyIDs and type indicators.

TABLE 4

| Property Name | Property ID | Property ID Code | Type |
|---|---|---|---|
| Title | PID_TITLE | 0x00000002 | VT_LPSTR |
| Subject | PID_SUBJECT | 0x00000003 | VT_LPSTR |
| Author | PID_AUTHOR | 0x00000004 | VT_LPSTR |
| Keywords | PID_KEYWORDS | 0x00000005 | VT_LPSTR |
| Comments | PID_COMMENTS | 0x00000006 | VT_LPSTR |
| Template | PID_TEMPLATE | 0x00000007 | VT_LPSTR |
| Last Saved By | PID_LASTAUTHOR | 0x00000008 | VT_LPSTR |
| Revision Number | PID_REVNUMBER | 0x00000009 | VT_LPSTR |
| Total Editing Time | PID_EDITTIME | 0x0000000A | VT_FILETIME |
| Last Printed | PID_LASTPRINTED | 0x0000000B | VT_FILETIME |
| Create Time/Date* | PID_CREATE_DTM | 0x0000000C | VT_FILETIME |
| Last saved Time/Date* | PID_LASTSAVE_DTM | 0x0000000D | VT_FILETIME |
| Number of Pages | PID_PAGECOUNT | 0x0000000E | VT_I4 |
| Number of Words | PID_WORDCOUNT | 0x0000000F | VT_I4 |
| Number of Characters | PID_CHARCOUNT | 0x000000010 | VT_I4 |
| Thumbnail | PID_THUMBNAIL | 0x000000011 | VT_CF |
| Name of Creating Application | PID_APPNAME | 0x000000012 | VT_LPSTR |
| Security | PID_SECURITY | 0x000000013 | VT_I4 |

*Some methods of file transfer (such as a download from a BBS) do not maintain the file system's version of this information correctly.

Second, tools can be developed that manipulate property sets generally without having any understanding of the semantics of the properties stored within the property sets. For example, a browsing tool can be created for displaying the properties of an object without understanding anything about the object.

Third, property sets can be used to provide a surrounding context for the properties of other objects. The surrounding properties are sometimes referred to as ambient properties. Other objects may respond to changes in such ambient properties by modifying the values of their properties. Such behavior is typically desirable in an environment where one object contains one or more subobjects, and the program implementing these subobjects desires to change properties of the subobjects when certain properties of the containing object change.

Figure 12:
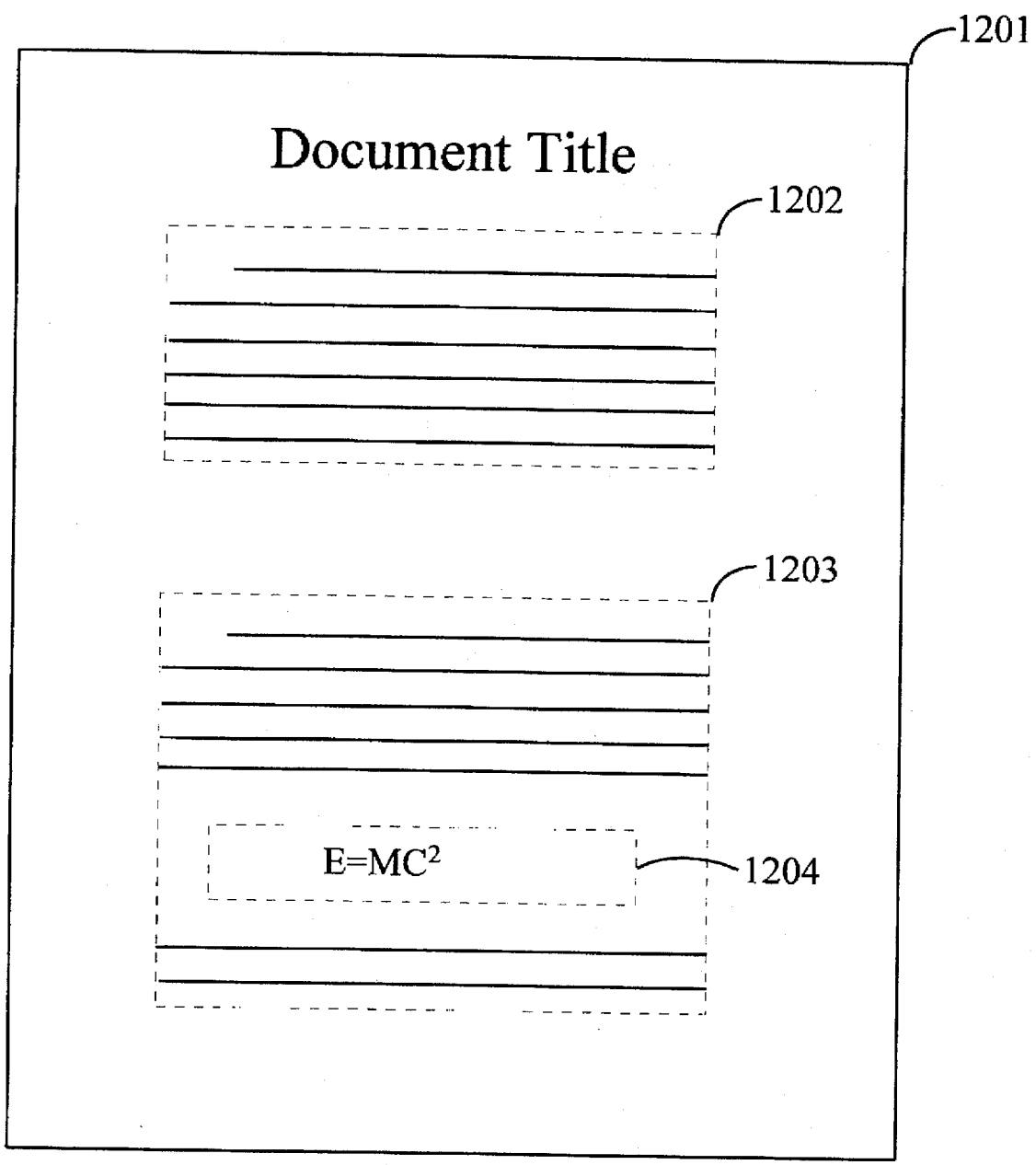
FIG. 12 is a block diagram of a compound document that utilizes ambient property capabilities.

For example, a compound document, which is an object that can contain objects implemented by multiple applications, may contain a paragraph object with an equation object appearing within the paragraph object. FIG. 12 is a block diagram of a compound document. Document object 1201 contains two paragraph objects 1202 and 1203 implemented by a word processing program. In addition, paragraph object 1203 contains an equation object 1204 implemented by a (different) mathematical program. In this scenario, it may be desirable to cause certain properties of the equation object to change when certain ambient properties are changed in the surrounding paragraph object. For example, when the point size of the characters in paragraph 1203 is enlarged, it may be desirable to change the corresponding point size property (assuming one exists) in the equation object 1204.

In order to implement ambient property capabilities, the standard structure for representing property sets is combined with some kind of data transfer mechanism that can transfer the relevant properties from one application to another (as with any other data format). For example, the data transfer mechanism provided by the Microsoft OLE 2.0 environment can be used to support the transfer of the point size property from the paragraph object 1203 to the equation object 1204. This data transfer mechanism is discussed in further detail in U.S. application Ser. No. 08/632,307, entitled "Uniform Data Transfer," which is herein incorporated by reference. This data transfer mechanism supports a method for getting data from an object ("GetData") and a method for sending data to an object ("SendData"). It also supports a mechanism for a first object to set up a notification connection with a second object such that, upon the occurrence of some registered event, the second object notifies the first object that a particular event has occurred. Using a data transfer mechanism such as that described, in response to notification that a particular event has occurred, the first object can request the desired property set from the second object using the second object's GetData method.

Fourth, property sets, due to their partially self-describing nature, can be used generally for transferring data between applications. Each property within a property set identifies its own data format through the type indicator. As with ambient properties, using property sets for generally transferring data depends upon combining the present invention with an underlying data transfer mechanism.

Fifth, property sets provide an application-independent mechanism for providing a thumbnail sketch of the contents of an object for browsing purposes by defining a property to hold the thumbnail sketch. Typically, a thumbnail sketch is used to display information regarding the contents of an object without knowledge of its contents. A thumbnail sketch that is implemented as a property value within a property set is easily changed as the contents of an object are modified. Thus, the thumbnail sketch can provide an up-to-date quick view of the contents of an object without any knowledge of the object.

Sixth, using property sets, a user can extend the capabilities of an object by making use of other programs that implement behavior based upon attached properties independent of the object to which they are attached. For example, suppose a chart object has a drop shadow property attached to the object through the structured storage for the chart object. Even though the application implementing the chart object may know nothing about the drop shadow property or how to implement drop shadows, when a user embeds the chart object in an object implemented by a program knowing how to draw drop shadows, the chart object can be drawn with a surrounding drop shadow. To a user, the capabilities of the chart object appear to be extended by placing the object in an environment that can respond in an intelligent way to its attached properties.

Seventh, data from a database can be stored naturally in a property set stream for later access. The standard structure for storing a property set is sufficiently general to support many mappings between the data stored in a database and property sets. For example, each record in a database can be stored as a separate property set.

One skilled in the art will recognize that many other uses of the present invention are possible beyond those discussed.

Although the present invention has been described in terms of preferred embodiments, it is not intended that the invention be limited to these embodiments. Equivalent methods, structures, processes, steps, and other modifications within the spirit of the invention fall within the scope of the invention. The scope of the present invention is defined by the claims which follow.

We claim:

1. A method in a computer system for modifying a target property of a target object based upon an ambient property of a surrounding object, each property having a value, the method comprising the computer-implemented steps of:

determining whether the ambient property of the surrounding object exists; and when it is determined that the ambient property exists,
retrieving the value of the ambient property from the surrounding object; and
setting the value of the target property based upon the retrieved value of the ambient property.

2. A method in a computer system for extending behavior of an object, the object having a set of methods which define an initial behavior of the object and which are implemented by a first program, the method comprising the computer-implemented steps of:

storing a property set in a storage device of the computer system, such that the property set is associated with the object, the property set containing at least one property value with an associated property type, the stored property set having a unique format identifier for uniquely identifying the property set; and under control of a second program, performing a new behavior on the object, the new behavior not being part of the initial behavior of the object by, retrieving, from the storage device, the stored property set associated with the object;

determining whether a requisite property is defined in the stored property set using the unique format identifier of the retrieved property set;

when the requisite property is defined, retrieving the at least one property value from the retrieved property set; and manipulating the object based upon the retrieved property value.

3. A method in a computer system for modifying a first property of a first object based upon a second property of a second object, the first object being associated with first code for implementing the first object, the second object being associated with second code for implementing the second object, the method comprising the computer-implemented steps of:

under control of the first code, storing a property set for the first object in a first property set stream within a storage device of the computer system, the first property set stream containing the first property with a value;

under control of the second code, storing a property set for the second object in a second property set stream within the storage device, the second property set stream containing the second property with a value and having a unique format identifier for uniquely identifying the property set; and under control of the first code, retrieving, from the storage device, the second property set stream;

determining whether the second property is stored in the second property set stream using the unique format identifier of the retrieved second property set stream;

when it is determined that the second property is stored in the second property set stream, retrieving the value of the second property from the retrieved second property set stream; and setting the value of the first property, stored in the first property set stream in the storage device, based upon the retrieved value of the second property.

4. A computer system for extending behavior of an object, the object having a set of methods which define an initial behavior of the object, the system comprising:

a storage device;

a property set stored in the storage device of the computer system, the property set associated with the object and containing at least one property value with an associated property type, the stored property set having a unique format identifier for uniquely identifying the property set; and a computer program which, in response to being executed, performs a new behavior on the object, the new behavior not being part of the initial behavior of the object by, retrieving, from the storage device, the stored property set associated with the object;

determining whether a requisite property is defined in the stored property set using the unique format identifier of the retrieved property set;

when the requisite property is defined, retrieving the at least one property value from the retrieved property set; and manipulating the object based upon the retrieved property value.

5. The computer system of claim 4, wherein the property set is arranged in the storage device as:

a collection of zero or more properties contained in a section, each property having a property identifier for uniquely identifying the property within the section, each property having a data value, and each property having a type identifier which describes a format for the data value, the section having a section header that identifies a count of the properties contained in the section;

a section locator having the unique format identifier, and having locating information, which is used by the computer program to locate the section; and a header having an identifier for identifying the collection of properties contained in the section.

6. A computer system for extending behavior of an object, the object having a set of methods which define an initial behavior of the object, the system comprising:

memory means;

property set generation means for generating and storing in the memory means a property set associated with the object, the property set containing at least one property value with an associated property type and having a unique format identifier for uniquely identifying the property set; and object behavior extension means which, in response to being executed, performs a new behavior on the object, the new behavior not being part of the initial behavior of the object by, retrieving from the memory means the stored property set associated with the object;

determining whether a requisite property is defined in the stored property set using the unique format identifier of the retrieved property set;

when the requisite property is defined, retrieving the at least one property value from the retrieved property set; and manipulating the object based upon the retrieved property value.

7. A computer system for modifying a target property of a target object based upon a source property of a source object, the computer system comprising:

a storage device;

first code which, in response to being executed, stores a property set for the source object in a first property set stream within the storage device, the first property set stream containing the source property with a value and having a unique format identifier for uniquely identifying the first property set; and second code which, in response to being executed,
stores a property set for the target object in a second property set stream within the storage device, the second property set stream containing the target property with a value;

retrieves, from the storage device, the first property set stream;

determines whether the source property is stored in the first property set stream by using the unique format identifier of the retrieved first property set stream;

retrieves the value of the source property from the retrieved first property set stream, when it is determined that the source property is stored in the first property set stream; and sets the value of the target property, stored in the second property set stream in the storage device, based upon the retrieved value of the source property.

8. The computer system of claim 7, wherein the first property set stream is arranged in the storage device as:

a collection of zero or more properties contained in a section, each property having a property identifier for uniquely identifying the property within the section, each property having a data value, and each property having a type identifier which describes a format for the data value, the section having a section header that identifies a count of the properties contained in the section;

a section locator having the unique format identifier, and having locating information, which is used by the second code to locate the section; and a header having an identifier for identifying the collection of properties contained in the section.

9. A computer system for modifying a target property of a target object based upon a source property of a source object, the computer system comprising:

memory means;

first property set generation means for generating and storing in the memory means a first property set associated with the source object, the first property set containing the source property with a value and having a unique format identifier for uniquely identifying the first property set;

second property set generation means for generating and storing in the memory a second property set associated with the target object, the second property set containing the target property with a value; and object property modification means which, in response to being executed, retrieves, from the memory means, the first property set;

determines whether the source property is stored in the first property set by using the unique format identifier of the retrieved first property set;

retrieves the value of the source property from the retrieved first property set, when it is determined that the source property is stored in he first property set; and sets the value of the target property, stored in the second property set in the memory means, based upon the retrieved value of the source property.

10. A computer system for modifying a target property of a target object based upon an ambient property of a surrounding object, each property having a value, the computer system comprising:

a computer memory that stores the target property of the target object; and computer program that, in response to being executed, determines whether the ambient property of the surrounding object exists; and when it is determined that the ambient property exists, retrieving the value of the ambient property by requesting the value of the ambient property from the surrounding object; and setting the value of the target property in the computer memory based upon the retrieved value of the ambient property.

11. The computer system of claim 10 further comprising:

a property set stream, stored in the computer memory, the property set stream having a collection of properties, wherein one of the properties is the ambient property of the surrounding object, and having a class identifier for identifying code that is invoked by the computer program to retrieve the value of the ambient property from the surrounding object.

12. A computer-readable memory medium containing instructions for controlling a computer processor in a computer system to extend behavior of an object, the object having a set of methods which define an initial behavior of the object and which are implemented by a first program, by performing the steps of:

storing a property set in a storage device of the computer system, such that the property set is associated with the object, the property set containing at least one property value with an associated property type, the stored property set having a unique format identifier for uniquely identifying the property set; and under control of a second program, performing a new behavior on the object, the new behavior not being part of the initial behavior of the object by, retrieving, from the storage device, the stored property set associated with the object;

determining whether a requisite property is defined in the stored property set using the unique format identifier of the retrieved property set;

when the requisite property is defined, retrieving the at least one property value from the retrieved property set; and manipulating the object based upon the retrieved property value.

13. The computer-readable memory medium of claim 12 wherein the property set is arranged in the storage device as:

a collection of zero or more properties contained in a section, each property having a property identifier for uniquely identifying the property within the section, each property having a data value, and each property having a type identifier which describes a format for the data value, the section having a section header that identifies a count of the properties contained in the section;

a section locator having the unique format identifier, and having locating information, which is used by the computer program to locate the section; and a header having an identifier for identifying the collection of properties contained in the section.

14. A computer-readable memory medium containing instructions for controlling a computer processor in a computer system to modify a first property of a first object based upon a second property of a second object, the first object being associated with first code for implementing the first object, the second object being associated with second code for implementing the second object, by performing the steps of:

under control of the first code, storing a property set for the first object in a first property set stream within a storage device of the computer system, the first property set stream containing the first property with a value;

under control of the second code, storing a property set for the second object in a second property set stream within the storage device, the second property set stream containing the second property with a value and having a unique format identifier for uniquely identifying the property set; and under control of the first code, retrieving, from the storage device, the second property set stream;

determining whether the second property is stored in the second property set stream using the unique format identifier of the retrieved second property set stream;

when it is determined that the second property is stored in the second property set stream, retrieving the value of the second property from the retrieved second property set stream; and setting the value of the first property, stored in the first property set stream in the storage device, based upon the retrieved value of the second property.

15. A computer-readable memory medium containing instructions for controlling a computer processor in a computer system to modify a target property of a target object based upon an ambient property of a surrounding object, each property having a value, by performing the steps of:

determining whether the ambient property of the surrounding object exists; and when it is determined that the ambient property exists, retrieving the value of the ambient property from the surrounding object; and setting the value of the target property based upon the retrieved value of the ambient property.

* * * * *